Sept. 7, 1937.  A. H. TURNER  2,092,098
CRYSTAL CONTROLLED OSCILLATOR
Filed Aug. 31, 1935
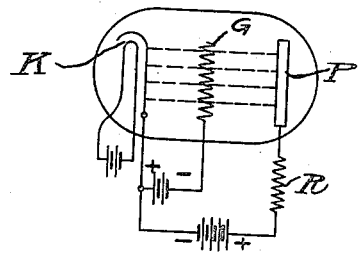
*Fig. I.*
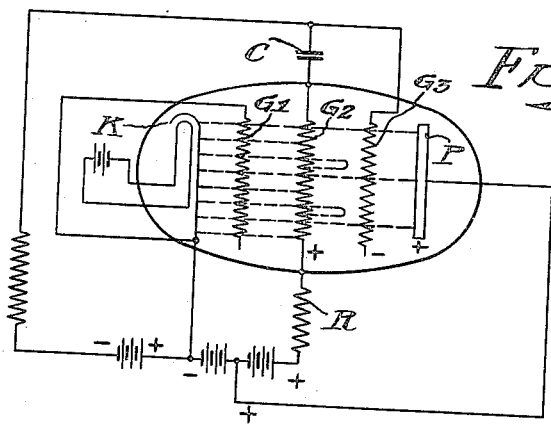
*Fig. II.*
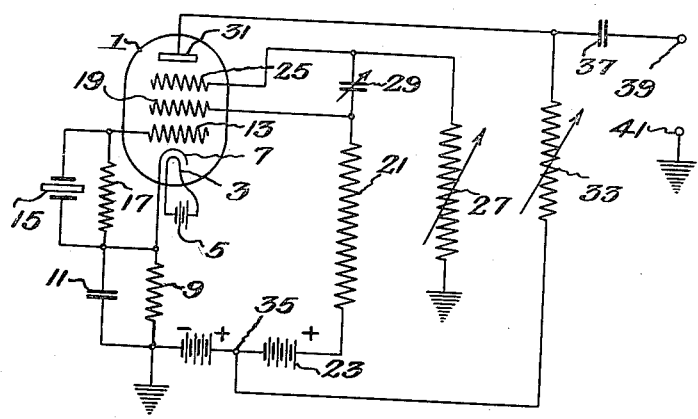
*Fig. III.*
Witnesses:
CD. Tuska
George L. Jepson
Inventor
Alfred H. Turner
by T R Goldsborough
Attorney Patented Sept. 7, 1937

2,092,098

UNITED STATES PATENT OFFICE 2,092,098

CRYSTAL CONTROLLED OSCILLATOR

Alfred H. Turner, Collingswood, N. J., assignor to Radio Corporation of America, a corporation of Delaware Application August 31, 1935, Serial No. 38,694

8 Claims. (Cl. 250—36)

My invention relates to thermionic oscillators. Specifically my invention relates to a piezoelectrical or crystal controlled oscillator having a negative resistance characteristic.

One of the objects of my invention is to control the oscillatory frequency of a negative resistance oscillator.

Another object is to control the frequency of a negative resistance oscillator by means of a piezo-electric element.

A further object lies in a piezo-electrically controlled negative resistance oscillator in which the piezo-electric element is not subjected to excessive heating currents, and in which the output circuit is substantially independent of the input circuit.

Additional objects will appear in the accompanying specification and claims.

Figure I is a schematic diagram of a three electrode thermionic tube,

Fig. II is a schematic diagram of a negative resistance oscillator, and

Fig. III is a circuit diagram of one embodiment of my invention.

In Fig. I, a three electrode thermionic tube is illustrated. If the grid potential is made less negative, the plate current increases. Increased plate current through the plate resistance R decreases the plate potential. If the decreased plate potential were fed back to the grid, it would be out of phase with the grid potential and the device would not show any positive feedback or oscillatory characteristics. If the phase in the plate circuit could be reversed, the output or plate circuit energy would be fed back to the grid in proper phase to maintain oscillations. Expressed in other terms: if the plate current could be made to decrease when the grid voltage is made more positive, the effects, or phases would not be opposed but in proper relation to sustain oscillations if the output currents were fed back to the input.

Fig. II represents a circuit having the characteristic of the arrangement suggested in the description immediately above. Consider the central grid $G_2$ a positive electrode, the outer grid $G_3$ as a control grid, and K as the cathode. The effect of the first or inner grid $G_1$ may be neglected for the moment. Electrons will leave the cathode K as represented by the dotted lines. The center grid electrode $G_2$ is given a positive charge. Most of the electrons emitted at the cathode K will pass to the positive grid $G_2$ but, since this electrode has a grid-like structure, some of the electrons will pass through its meshes and start toward the outermost plate or anode P which has a less high positive charge than the center grid $G_2$. The outer grid $G_3$ with its negative charge, will repel some of the electrons which will be turned and attracted to the more positive grid electrode $G_2$. As the outer grid $G_3$ is made less negative, it will repel less electrons to the center grid $G_2$, and permit more to pass to the outer plate P. The positive potential of the outer plate P must not be made so high that the outer control grid $G_3$ will have little effect on the electronic currents flowing to the outer plate. The outer control grid $G_3$ must turn back a substantial quantity of electrons to efficiently use the negative resistance characteristic just described.

Thus we have a circuit in which increased positive or less negative charges on a control grid, cause decreased plate current. Decreased current flowing through the resistor R will increase the positive potential on center grid $G_2$. The instantaneous increased positive potentials, if fed to the control grid $G_3$, will be in phase to sustain oscillations. A capacity C of suitable value between the center grid $G_2$ and outer control grid $G_3$ is all that is required to feed back properly phased potentials.

If the inductance of the leads is negligible, the frequency of oscillation or time period depends upon the product of the coupling capacity and resistance (T=CR). The frequency may be made very low by using a large capacity and a small resistance. The lowest frequency is limited by the lowest voltage drop across the resistance which will sustain oscillations. The highest frequency is limited by the interelectrode capacity of the thermionic tube and the electron transit time. This upper limit of the fundamental frequency is of the order of 20 megacycles.

The circuit shown in Fig. II will oscillate as a so-called relaxation oscillator. Briefly a relaxation oscillator is an electronic device having a cycle of operation dependent upon the time required to charge and discharge a reactance.

Such oscillators are generally characterized by large oscillatory currents, anode currents approaching saturation, and oscillations of an irregular frequency characteristic. I propose to overcome these defects and control the frequency of oscillation by making use of the first or inner grid $G_1$. I shall also couple an output circuit to the outer plate circuit of Fig. II so that the operation of the circuit will not be materially affected.

In Fig. III, in a thermionic tube 1, such as an RCA type 57, the heater 3 is connected to a source of energy 5. The cathode 7 is grounded through a self biasing resistor 9. The resistor is preferably by-passed by a capacity 11. Between the inner control grid 13 and the cathode is connected a piezo-electric crystal 15. A resistor 17 is shunted from control grid to cathode. A central grid electrode 19 is connected to a resistor 21 which is in turn connected to the positive terminal of the anode battery 23. The negative terminal of the anode battery is grounded. An outer grid electrode 25, which is located nearest the anode, is connected to ground through a variable resistor 27. A variable capacitor 29 is connected between the central and outer grid electrodes. The anode 31 is connected through a resistor 33 to a positive potential point 35 intermediate the ends of the anode battery. A coupling capacitor 37 is connected between the anode 33 and one output terminal 39. The other output terminal 41 may be grounded. A work circuit may be connected to the output terminals.

If the piezo-electric crystal is omitted from the circuit, the device will operate as a relaxation oscillator. The oscillations will have a frequency which is dependent upon the time constants of the elements. The oscillations will be characterized by a square wave form, and an abundance of harmonic frequencies. If the relative values of the variable capacitor 29 and the variable resistor 21 are altered, the frequency of the relaxation oscillations will be varied. Such oscillations are not of constant frequency.

After the piezo-electric element is connected, the relative values of the variable capacitor and variable resistor are altered until their time constant ($T=CR$) is near the natural mode of vibration of the piezo-electric crystal, or a multiple or sub-multiple of said natural mode. At this period or frequency of vibration the relaxation oscillator will energize the crystal. Thereafter the crystal will oscillate at its own natural frequency and synchronize the relaxation oscillations. The energy to maintain the oscillations of the crystal is derived from the oscillator and is fed across the inherent capacity between the inner and central grids. This capacity may be supplemented by a capacitor. The harmonic oscillations which are thus generated may be multiples or sub-multiples of the crystal frequency.

As is well known, certain crystals may have two natural modes of vibration. Each mode, or the frequencies of two modes may combine, and generate currents of a definite frequency. By adjusting the time constant of the relaxation oscillator to approximately any one of the natural modes or periods of oscillation of the crystal, the crystal will control the relaxation oscillations at the particular selected frequency or multiple or sub-multiple thereof. The crystal will then limit the relaxation oscillator to the particular fundamental frequency, its harmonics, or sub-harmonics.

By way of example, the following table of constants and values may be helpful:

*Thermionic tube—RCA tube 57*

| | | |
|---|---|---|
| Inner control grid to cathode resistance | ohms | 500,000 |
| Self bias resistance | do | 2,000 |
| Central grid to positive anode battery | do | 100,000 |
| Outer grid to ground | do | 10,000–10,000,000 |
| Anode resistance | do | 10–10,000 |
| Bypass capacity | mfds | 1.0 |
| Variable coupling capacity | do | 0–50 |
| Output coupling capacity | do | 1.0 |
| Anode battery | volts | 250 |
| Anode voltage | do | +25 |
| Central grid | do | +250 |

In the arrangement shown the inner control grid, because of the amplifying effect of the tube, does not require an excessive voltage to control the system. The crystal will not be subjected to excessive currents which tend to heat the crystal and alter its constant frequency characteristic. The crystal connected to inner control grid and cathode shows the most sensitive frequency control of the system. Although the crystal may be used in connection with any of the circuits in which oscillatory currents flow, and in several modified arrangements, I prefer the connection shown. However, the illustration of one preferred embodiment of my invention, must not be taken as evidence that I intend to limit my invention except as required by the prior art and the appended claims.

I claim as my invention:

1. In an oscillator, a thermionic tube having a cathode, anode, and plurality of grid electrodes including an inner grid, a center grid, and an outer grid, a source of anode current including a negative terminal, a connection between said cathode and the negative terminal of said source, a piezo-electric element effectively connected between cathode and said inner grid electrode, a resistance connected between the positive terminal of said anode current source and the center grid electrode, a resistance connected between the negative terminal of said anode current source and the outer grid electrode, a connection between said anode and a point having a potential less positive than the positive terminal of said anode source, a capacity coupling the center grid and the outer grid, means for adjusting one of said resistances and said capacity to thereby establish oscillatory currents, and means for impressing said currents on said piezo-electric element to thereby cause said element to vibrate at its natural frequency.

2. In an oscillator, a thermionic tube having a cathode, anode, and plurality of grid electrodes including an inner grid, a center grid, and an outer grid, a source of anode current including a negative terminal, means for biasing said cathode positively with respect to one of said grid electrodes, a connection between said cathode and the negative terminal of said source, a piezo-electric element effectively connected between cathode and said inner grid electrode, a resistance connected between the positive terminal of said anode current source and the center grid electrode, a resistance connected between the negative terminal of said anode current source and the outer grid electrode, a connection between said anode and a point having a potential less positive than the positive terminal of said anode source, a capacity coupling the center grid and the outer grid, means for adjusting one of said resistances and said capacity to thereby establish oscillatory currents, and means for impressing said currents on said piezo-electric element to thereby cause said element to vibrate at its natural frequency.

3. In an oscillator, a thermionic tube having a cathode, anode, and plurality of grid electrodes including inner, center, and outer grids, a source of anode current including a negative terminal, a piezo-electric element effectively connected between cathode and said inner grid electrode, a resistance connected between the positive terminal of said anode current source and the center grid electrode, a resistance connected between the negative terminal of said anode current source and the outer grid electrode, a connection between said anode and a point having a potential less positive than the positive terminal of said anode source, a variable capacity coupling the center grid and the outer grid, a biasing resistor connected between said cathode and the negative terminal of said source, means for adjusting one of said resistances and said capacity to thereby establish oscillatory currents, and means for impressing said currents on said piezo-electric element to thereby cause said element to vibrate at its natural frequency.

4. In an oscillator, a thermionic tube having a cathode, anode, and inner, outer and center grid electrodes, a source of anode current including negative and positive terminals, means for biasing said cathode positively with respect to one of said grid electrodes, a piezo-electric element effectively connected between cathode and said inner grid electrode, a resistance connected between the positive terminal of said anode current source and the center grid electrode, a resistance connected between the negative terminal of said anode current source and the outer grid electrode, a connection between said anode and a point having a potential less positive than the positive terminal of said anode source, a variable capacity coupling the center grid and the outer grid, a connection from said cathode to the negative terminal of said source, means for adjusting one of said resistances and said capacity to thereby establish oscillatory currents, and means for impressing said currents on said piezo-electric element to thereby cause said element to vibrate at its natural frequency.

5. In a device of the character described a thermionic tube having cathode, inner grid, center grid, outer grid, and anode electrodes, a source of anode current, means for grounding the negative terminal of said source, a piezo-electric element effectively connected between cathode and said inner grid, a resistance connected between cathode and said inner grid, a resistance connected between the positive terminal of said anode current source and said center grid, a resistance connected between ground and said outer grid, a connection between said anode and a positive potential point intermediate the positive and negative terminals of said anode current source, a capacity connected between the center grid and the outer grid, means connecting said cathode and the negative terminal of said source, means for adjusting one of said resistances and said capacity to thereby establish oscillatory currents, and means for impressing said currents on said piezo-electric element to thereby cause said element to vibrate at its natural frequency.

6. In a device of the character of claim 5 means for biasing one of said grid electrodes negatively with respect to cathode.

7. In a device of the character of claim 5 means for coupling said anode circuit with a pair of output terminals.

8. In an oscillator of the character described a thermionic tube having cathode, anode and inner, outer and centrally located grid electrodes, a source of current including positive and negative terminals, means for grounding said negative terminal, a resistance connecting the centrally located grid to said positive terminal, a resistance connecting the outer grid electrode to said negative terminal, a connection from said anode to a point of positive potential intermediate the aforementioned positive and negative terminals, a capacity coupling said central and outer grids whereby a negative resistance characteristic is established, a piezo-electric element connected between said inner grid and said cathode to synchronize the frequency of oscillations generated by said device, biasing means connecting said cathode and the negative terminal of said source, means for adjusting one of said resistances and said capacity to thereby establish oscillatory currents, and means for impressing said currents on said piezo-electric element to thereby cause said element to vibrate at its natural frequency.

ALFRED H. TURNER.